UNITED STATES PATENT OFFICE.

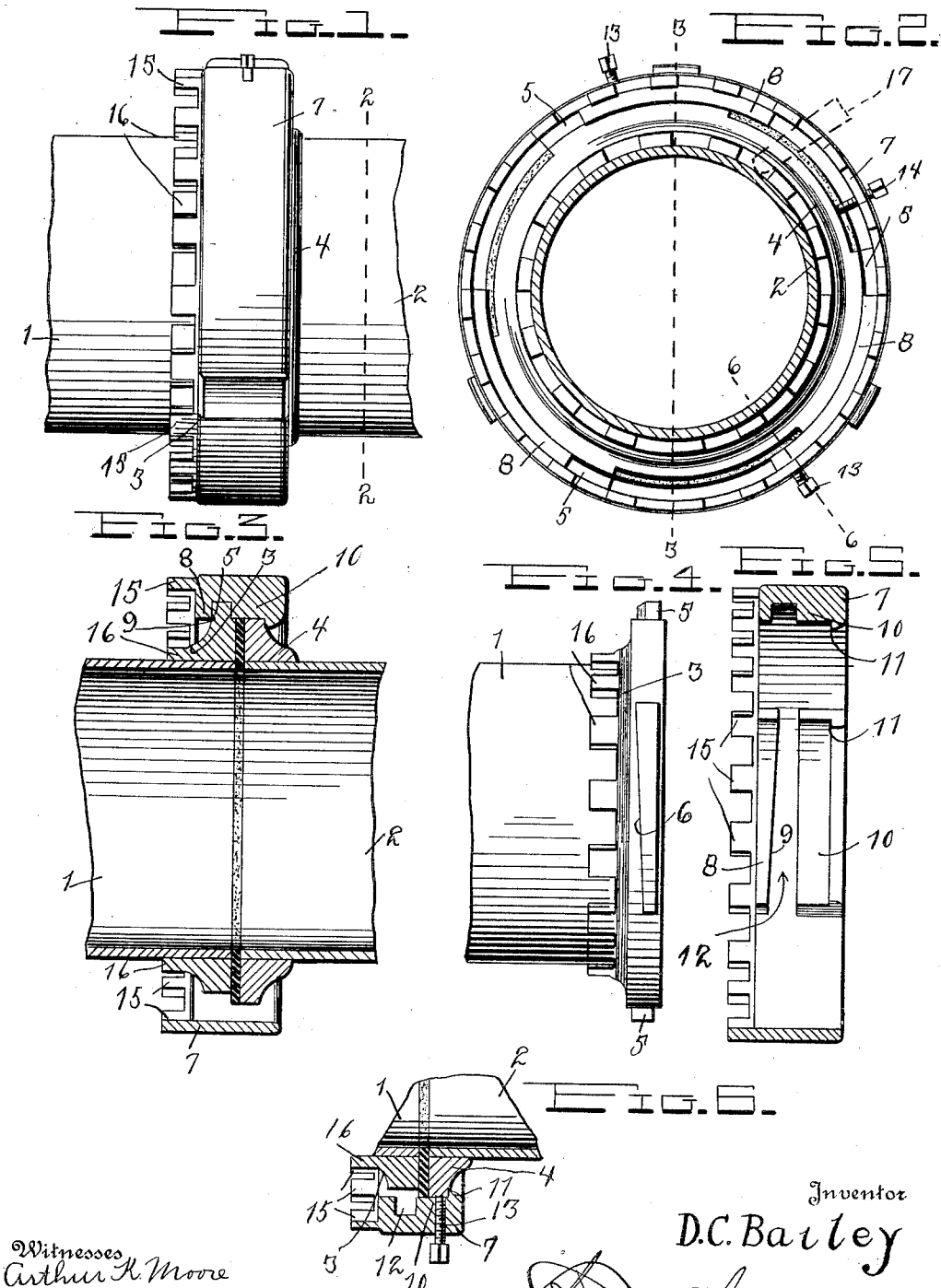

DE WITT C. BAILEY, OF MULBERRY, FLORIDA.

PIPE-COUPLING.

1,097,508.

Specification of Letters Patent.

Patented May 19, 1914.

Application filed August 21, 1913. Serial No. 736,015.

*To all whom it may concern:*

Be it known that I, DE WITT C. BAILEY, a citizen of the United States, residing at Mulberry, in the county of Polk, State of Florida, have invented certain new and useful Improvements in Pipe-Couplings; and I do hereby declare the following to be a full, clear, and exact description of the invention, such as will enable others skilled in the art to which it appertains to make and use the same.

The present invention is directed to pipe couplings, the same being an improvement on my application filed April 27, 1912, and allowed February 17, 1913.

The object of the present invention is to provide a pipe coupling which may be easily and quickly coupled or uncoupled, the coupling or uncoupling operation being facilitated by the employment of a bar.

With this and other objects in view, this invention resides in the novel features of construction, formations, combinations and arrangements of parts to be hereinafter more fully described, claimed and illustrated in the accompanying drawing, in which:

Figure 1 is an elevation of the device showing a pair of pipe sections coupled. Fig. 2 is a sectional view on the line 2—2 of Fig. 1. Fig. 3 is a sectional view on the line 3—3 of Fig. 2. Fig. 4 is an elevation of one of the pipe sections. Fig. 5 is a vertical sectional view through the ring. Fig. 6 is a sectional view on the line 6—6 of Fig. 2.

Referring to the drawing, the numerals 1 and 2 designate the pipes to be coupled, both of which are provided with flanged ends 3 and 4, the former having formed upon its periphery a plurality of spaced lugs 5, the outer edges of which are inclined as at 6. To hold the pipe sections in their coupled positions, a ring 7 is provided, the inner face of which is formed with a plurality of lugs 8. The lugs 8 are each provided with inclined edges 9, the purpose of which will appear later. The ring 7 has also formed on its inner face, and spaced from the lugs 8 a plurality of elongated projections 10, the number of projections being governed by the number of lugs 8. Each projection 10 is formed with a shoulder 11, against which the flanged end 4 of the pipe section 2 bears, said pipe section being held in clamped position when the lugs 5 formed on the flanged end 3 of the pipe section 1 pass between the lugs 8 of the ring 7, whereby when the ring is turned the inclined edges of the lugs 5 will engage the similar edge of the lug 8, said lugs 5 being guided in binding engagement with the lug 8 and projection 10 through the space 12 formed therebetween, thus limiting the turning movement of the ring in one direction. Set screws 13 are passed through the ring and have their inner ends adapted to engage the periphery of the flanged end 4 of the pipe section 2, thus holding the said ring and pipe section in fixed relation. To prevent accidental turning of the pipe section 1, a set screw 14 is passed through the ring 7, and is of sufficient length to have its inner end bear against the flanged end 3 of the pipe section 1, and at a point between the lugs 5 formed thereon, thereby holding said parts in fixed relation.

To facilitate the coupling operation and the uncoupling operation, the ring 7 has one of its edges formed with a plurality of spaced projections 15 which are adapted to co-act with the projections 16 formed upon the flanged end 3 of the pipe section 1 to rotate the ring 7, when the bar 17 is engaged between the projections and has as its fulcrum point one of the projections 15, it only being necessary to successively engage several of the projections to tightly bind the ring or remove the same. From this construction it will be seen that should the ring 7 become broken from any cause whatsoever, the same may be easily removed and a new one substituted therefor, as the construction of the ring is such that the same may be tilted to permit the flanged end 4 of the pipe section 2 to pass freely at points between the projections 10 either to remove a ring or substitute a new one. Thus it will be seen that the pipe sections may be coupled or uncoupled at any point in the pipe line, and that the rings may be interchanged if the occasion should require without uncoupling more than a pair of the pipe sections.

What is claimed is:

In a pipe coupling, the combination with the abutting flanged ends of a pair of pipe sections, of a ring engaging the ends to couple the same, an extended annular series of spaced projections extending longitudinally from one end of the ring, and a circumscribing series of spaced projections extending longitudinally from the end portion of one of the pipe sections within the inclosure of said annular series of projections of the ring and spaced radially therefrom to provide a relatively wide continuous annular tool receiving space to permit of the manipulation of a prying tool between the projections of the ring and the projections of the pipe sections when said sections are in substantially any position of adjustment.

In testimony whereof, I affix my signature, in the presence of two witnesses.

DE WITT C. BAILEY.

Witnesses:
M. L. SULLIVAN,
GEO. H. CHANDLER.

Copies of this patent may be obtained for five cents each, by addressing the "Commissioner of Patents, Washington, D. C."